(12) United States Patent
Kim

(10) Patent No.: US 10,581,520 B2
(45) Date of Patent: Mar. 3, 2020

(54) APPARATUS AND METHOD FOR COMPENSATING OPTICAL TRANSMISSION DELAY

(71) Applicant: SOLiD, INC., Seongnam-si, Gyeonggi-do (KR)

(72) Inventor: Ok Jin Kim, Seongnam-si (KR)

(73) Assignee: SOLiD, INC., Suwon-si (KR)

(*) Notice: Subject to any disclaimer, the term of this patent is extended or adjusted under 35 U.S.C. 154(b) by 0 days.

(21) Appl. No.: 16/062,951

(22) PCT Filed: Mar. 28, 2016

(86) PCT No.: PCT/KR2016/003143
§ 371 (c)(1),
(2) Date: Jun. 15, 2018

(87) PCT Pub. No.: WO2017/104905
PCT Pub. Date: Jun. 22, 2017

(65) Prior Publication Data
US 2018/0375573 A1    Dec. 27, 2018

(30) Foreign Application Priority Data

Dec. 18, 2015  (KR) .......................... 10-2015-0181743

(51) Int. Cl.
*H04B 10/00*    (2013.01)
*H04B 10/079*    (2013.01)
(Continued)

(52) U.S. Cl.
CPC ..... *H04B 10/0795* (2013.01); *H04B 10/2575* (2013.01); *H04J 3/0644* (2013.01);
(Continued)

(58) Field of Classification Search
CPC .......... H04B 10/0795; H04B 10/25753; H04B 10/2575; H04L 7/0075; H04J 3/0658; H04J 3/0635; H04J 3/0638; H04J 3/0667; H04J 3/0682
(Continued)

(56) References Cited

U.S. PATENT DOCUMENTS 8,363,563 B2 * 1/2013 Ko ...................... H04L 43/0852
370/252
2010/0172262 A1 7/2010 Ko et al.
(Continued)

FOREIGN PATENT DOCUMENTS

KR    10-2004-0035057 A    4/2004
KR    10-2010-0082068 A    7/2010
WO    2015/076480 A1    5/2015

OTHER PUBLICATIONS

International Search Report for PCT/KR2016/003143, dated Aug. 24, 2016.
(Continued)

*Primary Examiner* — Hanh Phan
(74) *Attorney, Agent, or Firm* — Sughrue Mion, PLLC

(57) ABSTRACT

The present invention provides a method of optical transmission delay compensation of a system including a main unit and a remote unit, wherein the main unit and the remote unit are connected to each other through an optical transmission line, including: receiving a reference signal, by the remote unit, generated by the main unit through the optical transmission line; analog converting the reference signal and performing analog processing on the reference signal; converting the analog-processed reference signal into an RF signal and radiating the RF signal; and measuring a delay time until the reference signal is generated and radiated as the RF signal. Accordingly, it is possible to obtain an effect of preventing degradation of service quality due to interference by synchronizing remote units and improving the service quality.

12 Claims, 7 Drawing Sheets

(51) Int. Cl.
     *H04B 10/2575*  (2013.01)
     *H04L 7/04*     (2006.01)
     *H04J 3/06*     (2006.01)
     *H04L 7/00*     (2006.01)
     *G01S 19/13*    (2010.01)

(52) U.S. Cl.
     CPC .......... *H04J 3/0682* (2013.01); *H04L 7/0075* (2013.01); *H04L 7/04* (2013.01); *G01S 19/13* (2013.01)

(58) Field of Classification Search
     USPC ....... 398/154, 155, 158, 159, 33, 25, 66, 67, 398/68, 72, 100, 115, 32, 161, 162, 70, 398/71; 370/352, 392, 389, 468, 503, 370/516, 350; 455/502, 503, 427
     See application file for complete search history.

(56) References Cited

U.S. PATENT DOCUMENTS

| | | | | |
|---|---|---|---|---|
| 2011/0262133 A1* | 10/2011 | Yuan | ...................... | H04J 3/0667 398/43 |
| 2013/0163618 A1* | 6/2013 | Sergeev | ................ | H04J 3/0658 370/503 |
| 2016/0112134 A1* | 4/2016 | Masunaga | .......... | H04B 10/0799 398/115 |

OTHER PUBLICATIONS

Communication issued in the European Patent Office in corresponding European Patent Application No. 16875847.2 dated Aug. 13, 2019.

\* cited by examiner

APPARATUS AND METHOD FOR COMPENSATING OPTICAL TRANSMISSION DELAY

CROSS-REFERENCE TO RELATED APPLICATIONS

This application is a National Stage of PCT International Application No. PCT/KR2016/003143, filed Mar. 28, 2016, and claims priority from Korean Patent Application No. 10-2015-0181743, filed Dec. 18, 2015, the contents of which are incorporated herein by reference in their entireties.

BACKGROUND

1. Field

The present invention relates to a method and system for optical transmission delay compensation, and more particularly, a method and system for optical transmission delay compensation for compensating for a data delay time for synchronizing repeaters connected to each other through an optical transmission line in a mobile communication system.

2. Description of the Related Art

FIG. 1 is a configuration diagram of a mobile communication system having a main unit (MU)-remote unit (RU) structure. As shown in FIG. 1, when a main unit 10 and a plurality of remote units 20 respectively located at different distances from the main unit 10 are matched with each other through an optical transmission line, large-capacity signal transmission may be performed. Such a mobile communication system has an advantage that data signals may be transmitted over a long distance due to a low loss characteristic of the optical transmission line.

When the main unit 10 and the plurality of remote units 20 are separated from each other by a relatively large distance corresponding to several kilometers to several tens of kilometers, each forward baseband signal transmitted from the main unit 10 and reaching each of the plurality of remote units 20 has time delay proportional to each distance. Since the time delay of the different forward baseband signals makes RF propagation times of the respective remote units 20 different, it may result in a fatal error in hand off when a mobile station MS of a mobile communication terminal subscriber moves from the current location (e.g., a location where RU #1 is responsible) to another location (e.g., a location where RU #3 is responsible). This is because handover may be performed only when phases of transmission signals in all of RU #1, RU #2, and RU #3 of each of the plurality of remote units 20 are the same.

SUMMARY

The present invention is directed to a method and system for optical transmission delay compensation for accurately synchronizing and compensating for a data transmission delay time generated between a main unit and a remote unit connected to each other through an optical transmission line or between remote units.

According to an aspect of the present invention, a method of optical transmission delay compensation of a system comprising a main unit and a remote unit, wherein the main unit and the remote unit are connected to each other through an optical transmission line, the method includes: receiving a reference signal, by the remote unit, generated by the main unit through the optical transmission line; analog converting the reference signal and performing analog processing on the reference signal; converting the analog-processed reference signal into an RF signal and radiating the RF signal; and measuring a delay time until the reference signal is generated and radiated as the RF signal.

In an example embodiment, the analog converting may include: converting the reference signal into an analog signal, and the analog processing comprises at least one of amplification, conversion, operation, and noise removal of the analog signal.

In an example embodiment, wherein the measuring of the delay time may include: generating a response signal corresponding to a time when the RF signal is radiated and transmitting the response signal to the main unit, wherein the main unit is configured to measure the delay time using the response signal.

In an example embodiment, wherein the main unit may receive a first GPS signal, and the remote unit may receive a second GPS signal, wherein the first GPS signal may be transmitted to the remote unit together with the reference signal, and the measuring of the delay time may include: measuring the delay time using the second GPS signal and the first GPS signal.

In an example embodiment, the method may further include: receiving a data signal, by the remote unit, compensated for by the delay time by the main unit from the main unit.

In an example embodiment, wherein the number of the reference signal may be more than one and phases of the reference signals may be different from each other, and the remote unit may generate a synchronization detection window, and the measuring of the delay time may include: measuring the delay time by detecting one of the plurality of reference signals through the synchronization detection window.

In an example embodiment, wherein the remote unit may generate a plurality of synchronization detection windows, and the measuring of the delay time may further include: measuring the delay time by using a window for detecting the reference signal from among the plurality of synchronization detection windows.

In an example embodiment, the method may further include: compensating for a data signal by the delay time by the remote unit.

According to another aspect of the present invention, a system including a plurality of remote units connected to a main unit through an optical transmission line and receiving a reference signal generated by the main unit, wherein each of the plurality of remote units includes: an analog converter for converting the reference signal into an analog signal; an analog processor for performing analog processing on the analog signal; an RF transceiver for converting the analog-processed analog signal into an RF signal and radiating an RF signal; and a delay time processor for measuring a delay time until the reference signal is generated and radiated as the RF signal.

In an example embodiment, wherein each of the plurality of remote units may further include: a second GPS receiver for receiving a second GPS signal, and the delay time processor is configured to measure the delay time using the second GPS signal.

In an example embodiment, wherein the delay time processor may be configured to transmit the delay time to the main unit.

In an example embodiment, wherein the number of the reference signal may be more than one and phases of the reference signals may be different from each other, and the delay time processor may be configured to generate a synchronization detection window and to measure the delay time by detecting one of the plurality of reference signals through the synchronization detection window.

In an example embodiment, wherein the delay time processor may be configured to generate a plurality of synchronization detection windows having different phases and to measure the delay time through a window for detecting the reference signal from among the plurality of synchronization detection windows.

In an example embodiment, wherein the delay time processor may be configured to compensate for a data signal received from the main unit by the delay time.

According to an embodiment of the present invention, the quality of service of a mobile communication system may be improved by accurately synchronizing between a main unit and a remote unit or between remote units.

DETAILED DESCRIPTION OF EXEMPLARY EMBODIMENTS

Figure 1:
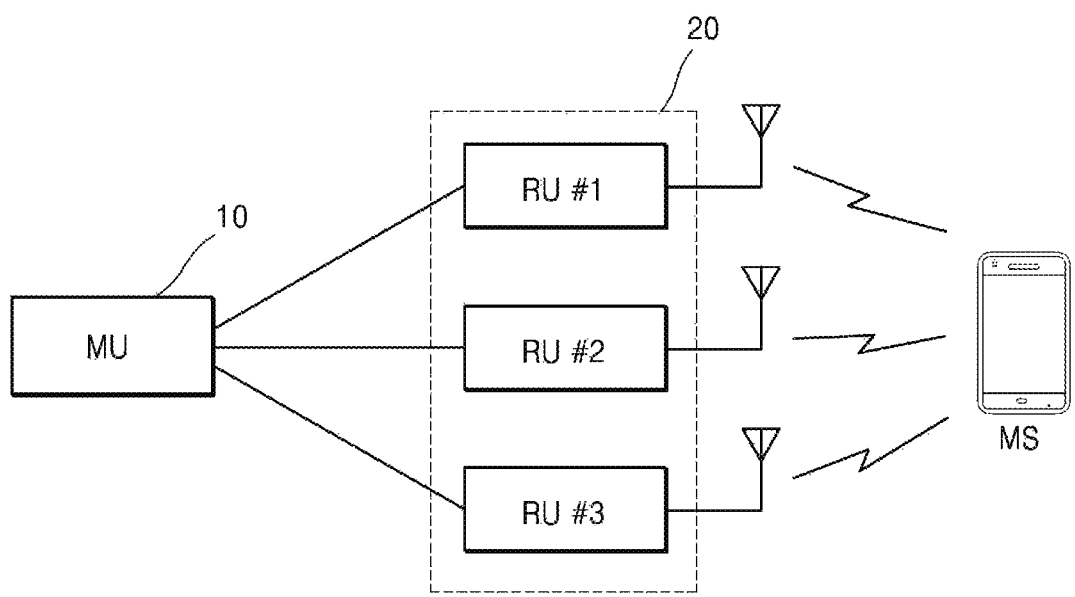
FIG. 1 is a configuration diagram of a mobile communication system having an MU-RU structure according to a conventional technique.

Since the present invention may have diverse modified embodiments, preferred embodiments are illustrated in the drawings and are described in the detailed description. However, this does not limit the present invention within specific embodiments and it should be understood that the present invention covers all the modifications, equivalents, and replacements within the idea and technical scope of the present invention.

In the description of the present invention, certain detailed explanations of the related art are omitted when it is deemed that they may unnecessarily obscure the essence of the present invention. In addition, numeral figures (for example, 1, 2, and the like) used during describing the specification are just identification symbols for distinguishing one element from another element. Further, in the specification, if it is described that one component is "connected" or "accesses" the other component, it is understood that the one component may be directly connected to or may directly access the other component but unless explicitly described to the contrary, another component may be "connected" or "access" between the components. In addition, terms including "unit", "er", "or", "module", and the like disclosed in the specification mean a unit that processes at least one function or operation and this may be implemented by hardware or software or a combination of hardware and software.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course. A method and system for optical transmission delay compensation according to an embodiment of the present invention will be described later below in detail with reference to FIGS. 2 to 5.

Figure 2:
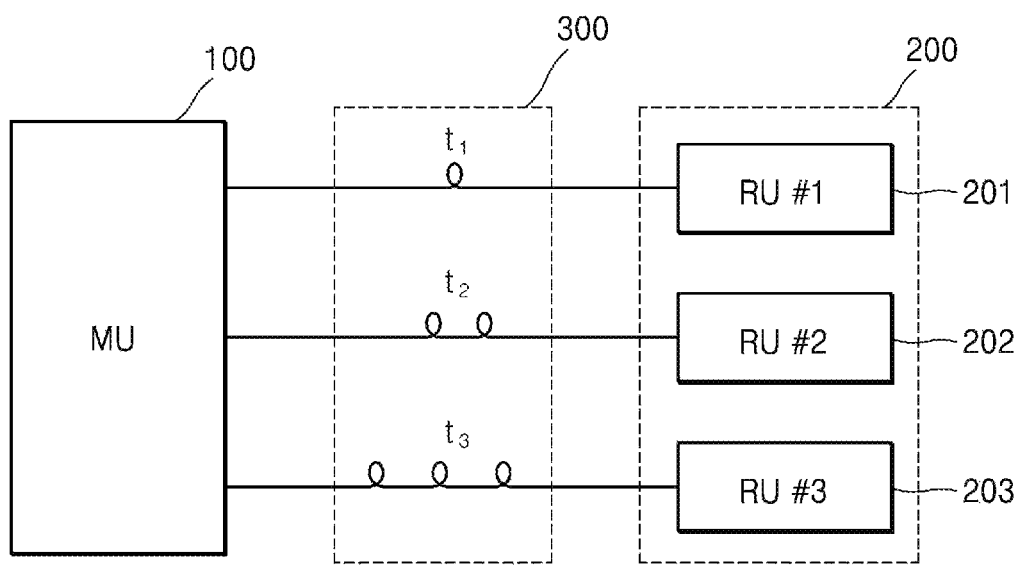
FIG. 2 is an overall configuration diagram of a system for optical transmission delay compensation according to an embodiment of the present invention.

Referring to FIG. 2, a main unit 100 is connected to a plurality of remote units 200. Although FIG. 2 illustrates a case where there are three remote units 200, the number of remote units 200 does not limit the scope of the present invention. The main unit 100 is connected to each of the plurality of remote units 200 through the optical transmission line 300. The plurality of remote units 200 may have respective distances from the main unit 100. Since the distances are different from each other, delay times between the main unit 100 and RU #1, RU #2, and RU #3 of the remote units 200 may be different from each other. For example, a delay time between the main unit 100 and a remote unit RU #1 201 is t1, a delay time between the main unit 100 and a remote unit RU #2 202 is t2, and a delay time between the remote unit RU #3 and a remote unit RU #3 203 may be t3.

Since the plurality of remote units 200 has an identical internal configuration, one of the remote units 201 will be described later below for convenience of explanation.

Figure 3:
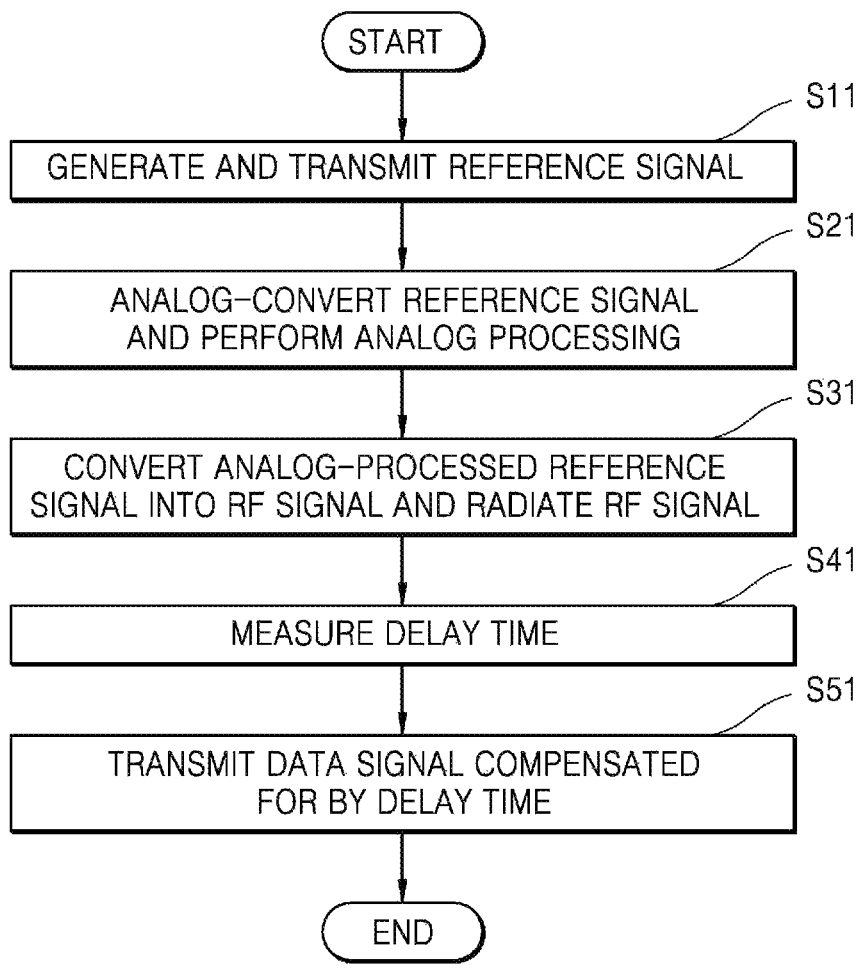
FIG. 3 is a flowchart illustrating a method of optical transmission delay compensation according to an embodiment of the present invention.
Figure 4:
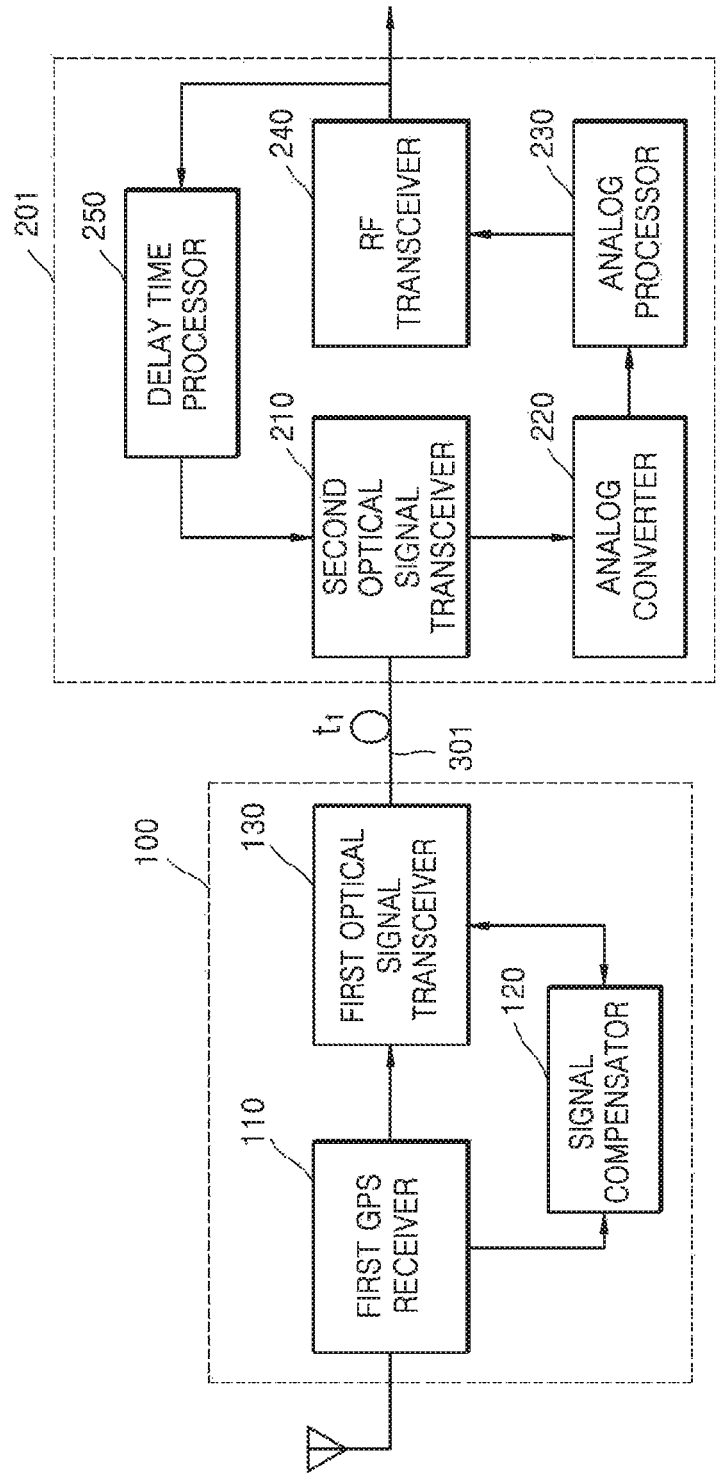
FIG. 4 is a detailed configuration diagram of a system for optical transmission delay compensation according to an embodiment of the present invention.

Referring to FIGS. 3 and 4, in operation S11, the main unit 100 generates a reference signal and transmits the reference signal to the remote unit 201 through an optical transmission line 301, and the remote unit 201 receives the reference signal through the optical transmission line 301.

The main unit 100 includes a first GPS receiver 110, a signal compensator 120, and a first optical signal transceiver 130. The first GPS receiver 110 receives a first GPS signal. The first GPS signal includes time information, which is necessary for measuring a delay time later. Here, the received GPS signal may be an RF signal.

The signal compensator 120 generates a reference signal. The reference signal is necessary for measuring the delay time t1 and for synchronizing the main unit 100 and the remote unit 201.

The first optical signal transceiver 130 transmits an optical signal, preferably a laser pulse, and receives various signals transmitted from the remote unit 201. The first optical signal transceiver 130 receives the reference signal generated by the signal compensator 120 and transmits the reference signal to the remote unit 201 through the optical transmission line 301.

The remote unit 201 includes a second optical signal transceiver 210, an analog converter 220, an analog processor 230, an RF transceiver 240, and a delay time processor 250.

The second optical signal transceiver 210 of the remote unit 201 receives the reference signal through the optical transmission line 301. The second optical signal transceiver 210 receives an optical signal, preferably a laser pulse, and transmits various signals to the main unit 201.

Subsequently, in operation S21, the remote unit 201 analog-converts the reference signal and performs analog processing. The analog converter 220 of the remote unit 201 receives the reference signal from the second optical signal transceiver 210 and converts the reference signal into an analog signal. The reference signal may be a digital signal, and the analog converter 220 converts the reference signal into an analog signal. The analog converter 220 converts a signal received from the second optical signal transceiver 210 into an analog signal.

The analog processor 230 performs analog processing on the analog signal received from the analog converter 220. Here, the analog processing means all operations that can be performed on an analog signal, and may include, for example, amplification, conversion, operation, noise removal, and the like of an analog signal.

Subsequently, in operation S31, the remote unit 201 converts the analog-processed reference signal into an RF signal and radiates the RF signal.

The RF transceiver 240 receives the reference signal analog-processed by the analog processor 230, converts the reference signal into an RF signal, and radiates the RF signal.

Subsequently, in operation S41, the remote unit 201 measures the delay time t1. The delay time processor 250 generates a response signal when receiving the RF signal radiated by the RF transceiver 240, and transmits the response signal to the second optical signal transceiver 210. That is, the delay time processor 250 may generate a response signal corresponding to a time when the RF signal is radiated. The second optical signal transceiver 210 transmits the response signal to the main unit 100 through the optical transmission line 301. The signal compensator 120 of the main unit 100 receives the response signal through the first optical signal transceiver 130. The signal compensator 120 may obtain the delay time t1 by using a time until a reference signal is generated and a response signal is received. When obtaining the delay time t1, a first GPS signal is used. A time when a reference signal is generated and a time when the response signal is received may be obtained through the first GPS signal. The delay time t1 is a time until a reference signal is generated and radiated as an RF signal by the RF transceiver 240.

Conventionally, a time required for the remote unit 201 to receive a signal transmitted from the main unit 100 is measured as a delay time. However, in the present invention, since the delay time t1 including a time required for processing, that is, analog conversion, in the remote unit 201, a time required for analog processing, and a time until the analog-processed signal is converted into an RF signal and the RF signal is radiated is obtained in addition to the above delay time. Therefore, the accurate delay time t1 may be obtained and accurate synchronization may be achieved.

Figure 5:
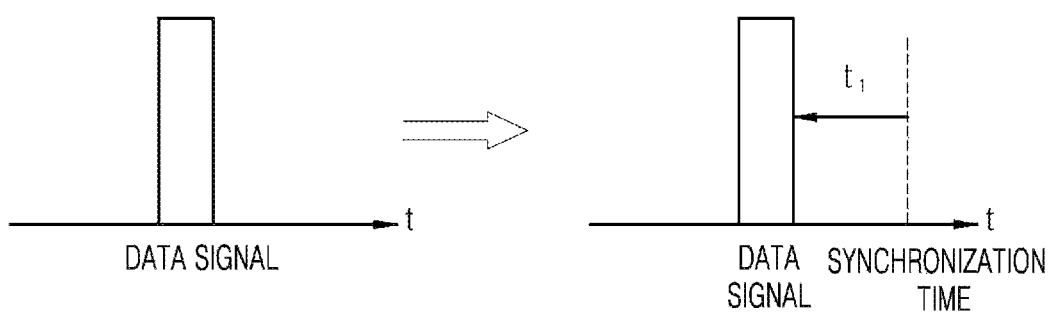
FIG. 5 is a graph illustrating a synchronization method according to an embodiment of the present invention.

Subsequently, in operation S51, the main unit 100 transmits a data signal compensated for by the delay time t1. In other words, the main unit 100 synchronizes the main unit 100 and the remote unit 201 by the delay time t1. Referring to FIG. 5, when the synchronization is completed through a reference signal, the main unit 100 compensates for a data signal by the delay time t1 when transmitting the data signal to the remote unit 201. In more detail, the main unit 100 uses a delay time to synchronize each of the plurality of remote units 200. The main unit 100 may transmit a data signal compensated for by the delay time t1 when transmitting data to the remote unit RU #1 201. Similarly, the main unit 100 may calculate the delay time t2 for the remote unit RU #2 and the delay time t3 for the remote unit RU #3 203 by the same or similar operation. Therefore, the main unit 100 may transmit a data signal compensated for by the delay time t2 when transmitting data to the remote unit RU #2 202, and may transmit a data signal compensated for by the delay time t3 when transmitting data to the remote unit RU #3 203. Whereby signals radiated from each of the plurality of remote units 200 may be synchronized.

A method and system for optical transmission delay compensation according to another embodiment of the present invention will be described later below with reference to FIGS. 2, 3, 5, and 6. The same content as those described above will not be described, and differences will be mainly described.

Figure 6:
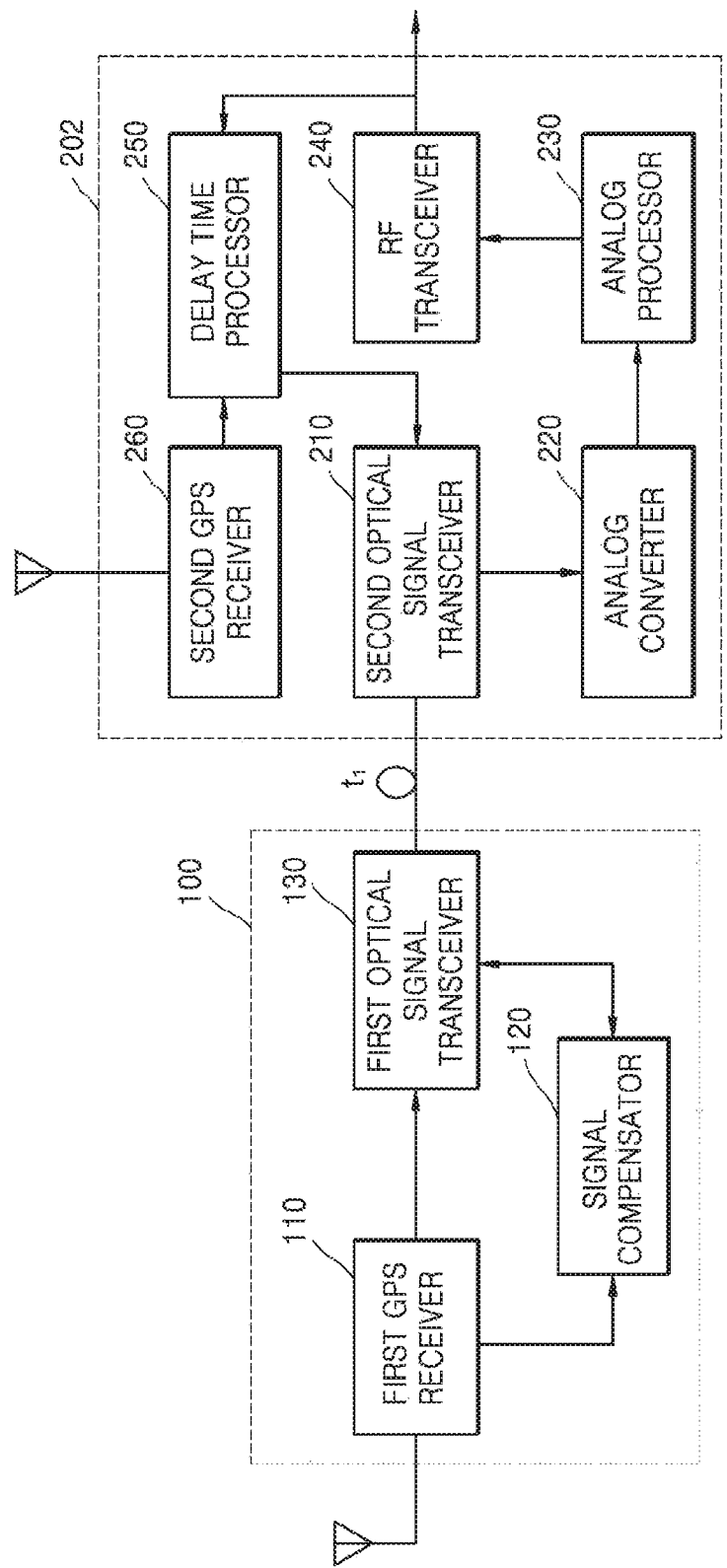
FIG. 6 is a detailed configuration diagram of a system for optical transmission delay compensation according to another embodiment of the present invention.

Referring to FIGS. 2 and 6, the remote unit 202 further includes a second GPS receiver 260. The second GPS receiver 260 receives a second GPS signal. Here, each of the plurality of remote units 202 includes the second GPS receiver 260 and receives the second GPS signal. The second GPS signal may include time information. The second GPS signal may be the same as or different from the first GPS signal. If the second GPS signal is the same as the first GPS signal, the remote unit 202 may have the same time information as the main unit 100.

The method and system for optical transmission delay compensation according to another embodiment of the present invention measure the delay time t1 by the delay time processor 250. The signal compensator 120 of the main unit 100 does not measure the delay time t1.

The delay time processor 250 receives the second GPS signal from the second GPS receiver 260. The main unit 100 provides the remote unit 202 with the first GPS signal as well as a reference signal. Therefore, the remote unit 202 may grasp a generation time of the reference signal through the first GPS signal. The delay time processor 250 measures the delay time t1 until a reference signal is generated and the reference signal is radiated as an RF signal by using the first GPS signal and the second GPS signal. A point in time when the RF signal is radiated through the second GPS signal may be measured. The delay time processor 250 transmits information about the delay time t1 to the main unit 100, and the signal compensator 120 of the main unit 100 compensates for a data signal by the delay time t1 to transmit the data signal to the remote unit 202.

Meanwhile, the delay time processor 250 may directly compensate for the data signal. In this case, the delay time processor 250 of the remote unit 202 may compensate for the data signal received from the main unit 100 by the delay time t1. Here, the main unit 100 does not compensate for the data signal.

A method and system for optical transmission delay compensation according to the other embodiment of the present invention will be described later below with reference to FIGS. 2 and 6 to 8. The same content as those described above will not be described, and differences will be mainly described.

The method and system for optical transmission delay compensation according to the other embodiment of the present invention are different from the method and system for optical transmission delay compensation according to another embodiment of the present invention in a process of measuring the delay time t1.

Figure 7:
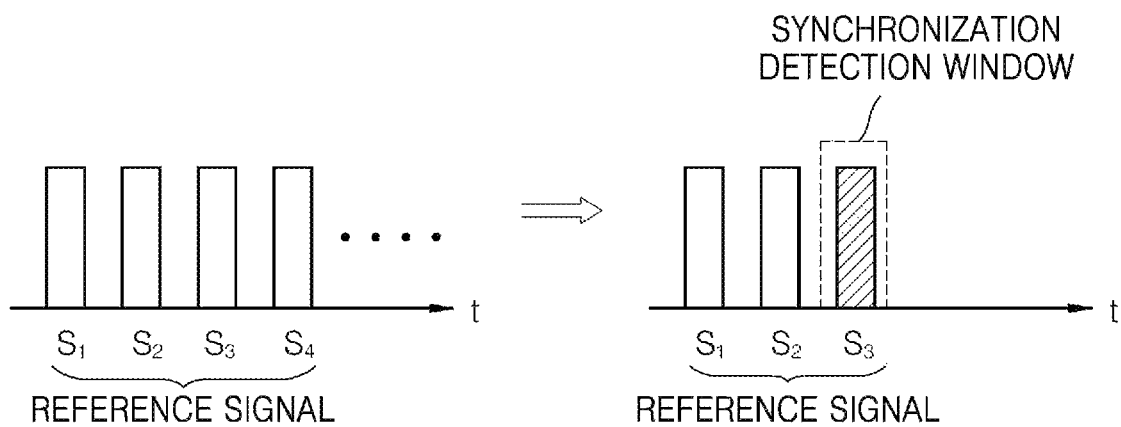
FIGS. 7 and 8 are graphs for explaining a method of measuring a delay time according to the other embodiment of the present invention.

Referring to FIGS. 6 and 7, the delay time processor 250 may measure the delay time t1 using the first GPS signal and the second GPS signal transmitted together with a reference signal. In more detail, the signal compensator 120 of the main unit 100 generates a plurality of reference signals S1, S2, S3, S4, . . . . The plurality of reference signals S1, S2, S3, S4, . . . generated using the first GPS signal are different from each other. For example, the plurality of reference signals S1, S2, S3, S4, . . . may be generated at the same time but may have different phases.

The delay time processor 250 of the remote unit 202 generates a synchronization detection window. The synchronization detection window is a signal for detecting a reference signal and may be generated at the same time as the time when a plurality of reference signals are generated using the second GPS signal. For example, the main unit 100 may transmit a signal indicating that a reference signal is generated and transmitted at A point in time to the remote unit 202. The remote unit 202 may generate a synchronization detection window based on the A point in time.

When the remote unit 202 receives the plurality of reference signals S1, S2, S3, S4, . . . , each reference signal is compared with the synchronization detection window and detected. For example, as shown in FIG. 7, the reference signal S3 from among the plurality of reference signals S1, S2, S3, S4, . . . may be detected through the synchronization detection window. The delay time processor 250 may measure the delay time t1 by comparing a phase of the reference signal S3 with a point where the synchronization detection window is generated. As described above, the phases of the plurality of reference signals S1, S2, S3, S4, . . . transmitted from the main unit 100 are different from each other, and the synchronization detection window may be generated so as to correspond to a point in time when the plurality of reference signals are generated. Accordingly, the delay time processor 250 may measure the delay time t1 using the phase of the reference signal S3 detected through the synchronization detection window from among the plurality of reference signals S1, S2, S3, S4, . . . .

Meanwhile, FIG. 7 shows that the plurality of reference signals S1, S2, S3, S4, . . . are generated at once and reference signals are detected through the synchronization detection window. However, the present invention is not limited thereto, and the signal compensator 120 may sequentially generate reference signals to measure the delay time t1. Also in this case, the main unit 100 may transmit a signal indicating that the reference signals are generated and transmitted from the A point in time to the remote unit 202. The remote unit 202 may generate a synchronization detection window based on the A point in time. Therefore, the main unit 100 generates the reference signal S1 at the A point in time and transmits the reference signal S1 to the remote unit 202. If the reference signal S1 is not detected through the synchronization detection window, the signal compensator 120 generates and transmits the reference signal S2. If the reference signal S2 is not detected through the synchronization detection window, the signal compensator 120 generates and transmits the reference signal S3. The main unit 100 may sequentially transmit the plurality of reference signals S1, S2, S3, S4, . . . to the remote unit 202 until there is a signal detected from the remote unit 202 through the synchronization detection window.

Figure 8:
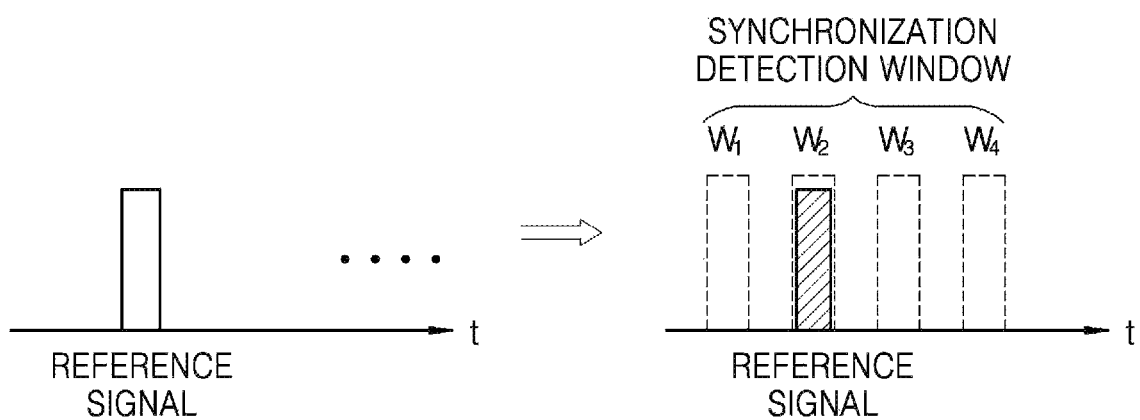

In FIG. 8, the delay time t1 is measured by a method different from that in FIG. 7. Referring to FIGS. 6 and 8, the main unit 100 generates and transmits only one reference signal, and the remote unit 202 generates a plurality of synchronization detection windows W1, W2, W3, W4, . . . . When the remote unit 202 receives the reference signal, the reference signal is compared with the synchronization detection windows W1, W2, W3, W4, . . . and detected. For example, the remote unit 202 may detect a reference signal through the synchronization detection window W2 from among the synchronization detection windows W1, W2, W3, W4, . . . . The delay time processor 250 may measure the delay time t1 by comparing a generation time of the reference signal with a phase of the synchronous detection window W2 in which the reference signal is detected.

That is, a phase of the synchronous detection window W1 is the same as that of the reference signal but phases of the remaining synchronization detection windows W2, W3, W4, . . . may be different. Also in this case, the main unit 100 may transmit a signal indicating that the reference signal is generated and transmitted at the A point in time to the remote unit 202. The remote unit 202 may generate the synchronization detection window W1 having the same phase as that of the reference signal on the basis of the A point in time. Therefore, the delay time processor 250 may measure the delay time t1 using a phase difference between the window W2 in which the reference signal is detected and the reference signal.

Meanwhile, FIG. 8 shows that the plurality of synchronization detection windows W1, W2, W3, W4, . . . are generated at once and a reference signal is detected. However, the present invention is not limited thereto, and the delay time processor 250 may sequentially form synchronization detection windows to measure the delay time t1. For example, first, if the synchronization detection window W1 is generated and a reference signal is not detected through the synchronization detection window W1, the delay time processor 250 generates the synchronization detection window W2. If the reference signal is not detected through the synchronization detection window W2, then the synchronization detection window W3 is generated. The remote unit 202 may sequentially generate the plurality of synchronization detection windows W1, W2, W3, W4, . . . until there is a signal detected from the remote unit 202 through a synchronization detection window.

In the above description, a case where a reference signal is converted into an RF signal and radiated by the remote unit 200 is mainly exemplified, but the reference signal may not be radiated as an RF signal. Since the radiation of the reference signal may be perceived as the radiation of a spurious. Therefore, the remote unit 200 may recognize the radiation of the reference signal at an antenna end just before the reference signal is radiated as the RF signal, and may process such that the reference signal is not radiated.

While the embodiments have been particularly shown and described, it will be understood by one of ordinary skill in the art that various changes in form and details may be made therein without departing from the inventive concept and scope of the present invention as defined by the appended claims.

The invention claimed is:

1. A method of optical transmission delay compensation of a system comprising a main unit and a remote unit, wherein the main unit and the remote unit are connected to each other through an optical transmission line, the method comprising:
   receiving a reference signal, by the remote unit, generated by the main unit through the optical transmission line;
   analog converting the reference signal and performing analog processing on the reference signal;
   converting the analog-processed reference signal into an RF signal and radiating the RF signal; and
   measuring a delay time until the reference signal is generated and radiated as the RF signal,
   wherein the main unit receives a first GPS signal, and the remote unit receives a second GPS signal, wherein the first GPS signal is transmitted to the remote unit together with the reference signal, and wherein the measuring of the delay time comprises measuring the delay time using the first GPS signal and the second GPS signal.

2. The method of claim 1, wherein the analog converting comprises:

converting the reference signal into an analog signal, and the analog processing comprises at least one of amplification, conversion, operation, and noise removal of the analog signal.

3. The method of claim 1, wherein the measuring of the delay time comprises:

generating a response signal corresponding to a time when the RF signal is radiated and transmitting the response signal to the main unit, wherein the main unit is configured to measure the delay time using the response signal.

4. The method of claim 1, further comprising:

receiving a data signal, by the remote unit, compensated for by the delay time by the main unit from the main unit.

5. The method of claim 1, wherein a number of the reference signal is more than one and phases of reference signals are different from each other, and the remote unit generates a synchronization detection window, and the measuring of the delay time comprises:

measuring the delay time by detecting one of the reference signals through the synchronization detection window.

6. The method of claim 1, wherein the remote unit generates a plurality of synchronization detection windows, and the measuring of the delay time further comprises:

measuring the delay time by using a window for detecting the reference signal from among the plurality of synchronization detection windows.

7. The method of claim 1, further comprising:

compensating for a data signal by the delay time by the remote unit.

8. A system including a plurality of remote units connected to a main unit through an optical transmission line and receiving a reference signal generated by the main unit, wherein each of the plurality of remote units comprises:

an analog converter configured to convert the reference signal into an analog signal;

an analog processor configured to perform analog processing on the analog signal;

an RF transceiver configured to convert the analog-processed analog signal into an RF signal and radiating the RF signal;

a GPS receiver configured to receive a GPS signal; and a delay time processor configured to measure a delay time until the reference signal is generated and radiated as the RF signal, using the GPS signal.

9. The system of claim 8, wherein the delay time processor is configured to transmit the delay time to the main unit.

10. The system of claim 8, wherein a number of the reference signal is more than one and phases of reference signals are different from each other, and the delay time processor is configured to generate a synchronization detection window and to measure the delay time by detecting one of the reference signals through the synchronization detection window.

11. The system of claim 10, wherein the delay time processor is configured to compensate for a data signal received from the main unit by the delay time.

12. The system of claim 8, wherein the delay time processor is configured to generate a plurality of synchronization detection windows having different phases and to measure the delay time through a window for detecting the reference signal from among the plurality of synchronization detection windows.

* * * * *